(12) United States Patent
Carter et al.

(10) Patent No.: US 8,017,048 B1
(45) Date of Patent: Sep. 13, 2011

(54) EMERGENCY SHELTER AND ASSOCIATED METHODS

(75) Inventors: James H. Carter, Delray Beach, FL (US); James W. Barnwell, Moravian Falls, NC (US)

(73) Assignee: JC Solutions, LLC, Delray Beach, FL (US)

( * ) Notice: Subject to any disclaimer, the term of this patent is extended or adjusted under 35 U.S.C. 154(b) by 1128 days.

(21) Appl. No.: 11/682,029

(22) Filed: Mar. 5, 2007

Related U.S. Application Data

(60) Provisional application No. 60/779,035, filed on Mar. 3, 2006.

(51) Int. Cl.
   *E04B 1/16* (2006.01)
(52) U.S. Cl. .............. 264/34; 264/31; 264/32; 52/232
(58) Field of Classification Search .......... 264/31, 264/32, 34; 52/82, 232
   See application file for complete search history.

(56) References Cited

U.S. PATENT DOCUMENTS

| | | | |
|---|---|---|---|
| 3,284,969 A | 11/1966 | Walters et al. | |
| 3,668,287 A | 6/1972 | Mackie | |
| 3,897,298 A * | 7/1975 | Gray | 156/500 |
| 4,156,503 A | 5/1979 | Norén | |
| 4,514,347 A | 4/1985 | Reed | |
| 4,678,157 A | 7/1987 | Fondiller | |
| 4,799,982 A | 1/1989 | Vicino | |
| 4,979,571 A | 12/1990 | MacDonald | |
| 5,823,218 A | 10/1998 | Schlecht et al. | |
| 5,918,438 A | 7/1999 | South | |
| 5,997,795 A * | 12/1999 | Danforth et al. | 264/401 |
| 6,451,430 B1 * | 9/2002 | Smith | 428/423.7 |
| 6,823,888 B1 | 11/2004 | Raymond | |
| 2003/0051418 A1 | 3/2003 | Crowder | |
| 2005/0196484 A1 * | 9/2005 | Khoshnevis | 425/463 |

OTHER PUBLICATIONS

Noorani, Rafiq (2006). Rapid Prototyping—Principles and Applications. (pp. 3). John Wiley & Sons. Online version available at: http://knovel.com/web/portal/browse/display?_EXT_KNOVEL_DISPLAY_bookid=2484&VerticalID=0.*

* cited by examiner

*Primary Examiner* — Christina Johnson
*Assistant Examiner* — Galen Hauth
(74) *Attorney, Agent, or Firm* — Allen Dyer Doppelt Milbrath & Gilchrist

(57) ABSTRACT

An emergency shelter includes a domed foam structure that is constructed on-site or at a remote location from foam that can be mixed on-site. The structure can be made on-site by spraying foam in a flowable state in a predetermined pattern to build up walls to form a dome. The foam can be sprayed, for example, in a substantially helical pattern from a centrally located spray nozzle that is rotated to deposit a finite-thickness increment of foam over a time period sufficient that, by the time the nozzle reaches a previously sprayed area, the foam already deposited has had time to cure.

22 Claims, 3 Drawing Sheets

EMERGENCY SHELTER AND ASSOCIATED METHODS

CROSS-REFERENCE TO RELATED APPLICATION

This application claims priority to provisional application Ser. No. 60/779,035, filed Mar. 3, 2006, entitled "Emergency Shelter and Associated Methods."

BACKGROUND OF THE INVENTION

1. Field of the Invention

The present invention relates to shelters and construction methods for same, and, more particularly, to such shelters that are quickly constructed on-site or at a remote manufacturing location with materials that are easy to transport, as well as the methods for constructing same.

2. Description of Related Art

After natural or man-made disasters, the problem of emergency housing can be acute. It is known in the art to erect tents for temporary shelter; however, tents are not permanent and are not sufficient for cold climates or in extreme winds. It is also known to erect mud domes and shelters from bags filled with soil that are joined with ropes, wires, or other means. It is further known to use foam as an insulating material.

It would be desirable to provide an emergency shelter that is constructable on-site from materials that are light and easily transported.

SUMMARY OF THE INVENTION

The present invention is directed to an emergency shelter and methods of constructing same. The shelter comprises in a preferred embodiment a domed foam structure that is constructed on-site from foam that is also mixed on-site, reducing shipping volume and costs, since the raw materials are relatively light. The water used for making the foam, which is heavy to transport, can be provided on-site.

An exemplary method of the present invention includes the steps of spraying foam in a flowable state in a predetermined pattern to free form walls to construct a dome or similar structure. The foam can be sprayed, for example, in a substantially circular or helical pattern from a centrally located spray nozzle that is rotated to deposit a finite-thickness increment of foam over a time period sufficient that, by the time the nozzle reaches a previously sprayed area, the foam already deposited has had time to cure. This curing has the effect of forming a somewhat rigid film over the top of the most recently deposited layer, which provides additional strength to the structure.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
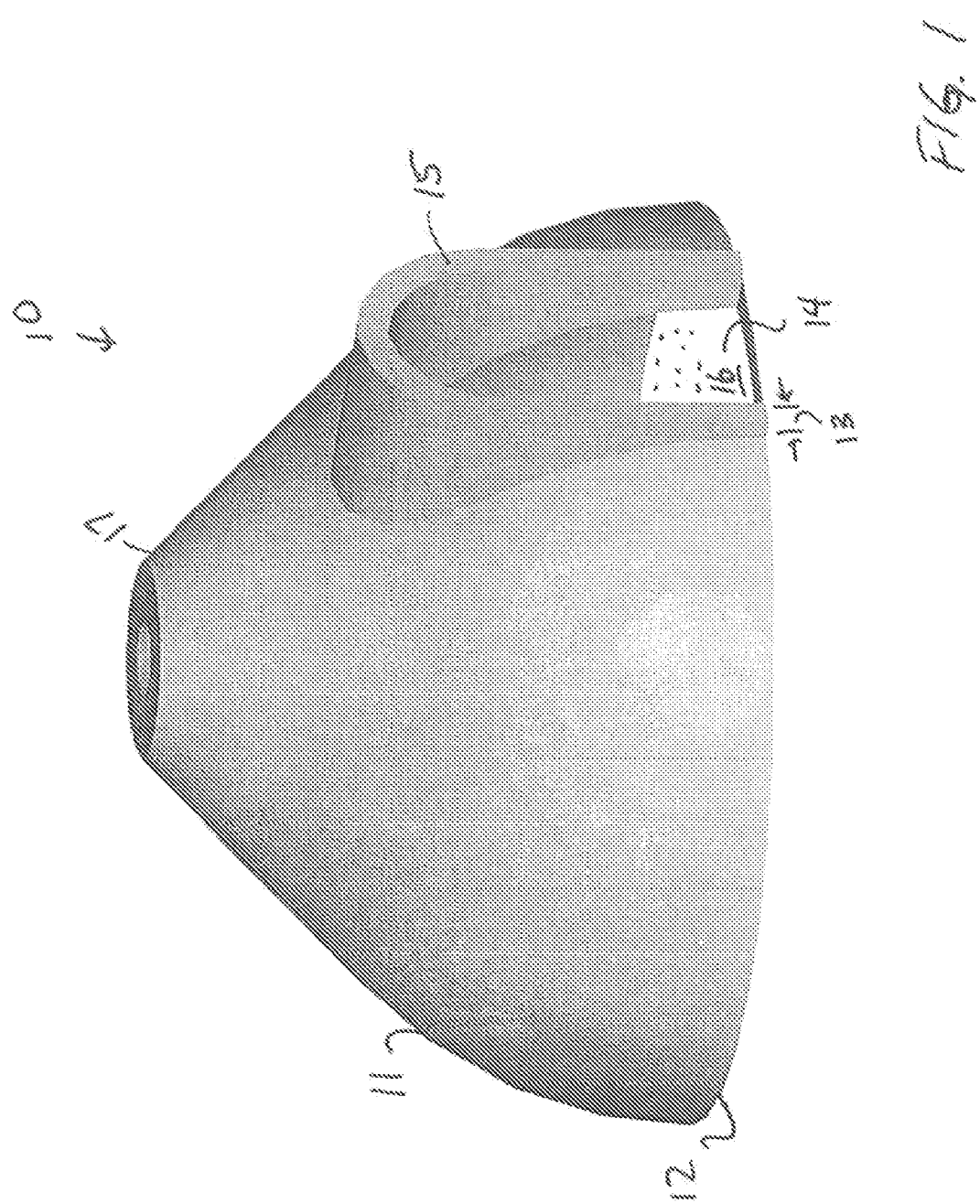
FIG. 1 is a side perspective view of an exemplary emergency shelter.

A description of the preferred embodiments of the present invention will now be presented with reference to FIGS. 1-4.

An exemplary shelter 10 of the present invention comprises a foam material that has sufficient strength to withstand inclement weather, high winds, and earthquakes. Since the structure itself is very light and aerodynamically shaped, it offers less wind resistance and is less likely to collapse. Further, since foam has gas pockets built in, it provides good insulation against cold or hot temperatures. Additional materials might in some embodiments be added to the foam, such as, but not intended to be limited to, glass fibers to improve strength.

In a preferred embodiment, the shelter 10 comprises a generally domed structure having a substantially continuous wall 11 that terminates on the ground at a lower edge 12. The wall 11 has a thickness 13 that is variable depending upon the site at which it is constructed and the overall size requirements for the structure. Additional features such as a door 14, doorway 15, windows, and ventilation/heating ducts may be constructed as desired. Flooring 16 may also be provided that can comprise a local and/or recycled material such as waste plastic or rubber. Foam having a protective coating may also be used as a flooring when specific site conditions permit.

The shelter 10 can be made on-site, as will be described in the following, or made remotely and brought to a desired location overland or dropped from a helicopter. The domed shape permits nesting of multiple shelters 10, which maximizes space usage, and the lightness of the foam material makes it feasible to transport many shelters per load. In a particular embodiment, not intended to be limiting, a shelter 10 having a diameter of 15 ft and height of 10 ft, with a wall thickness of 8 in. would weigh approximately 450 pounds, for example.

Figure 2:
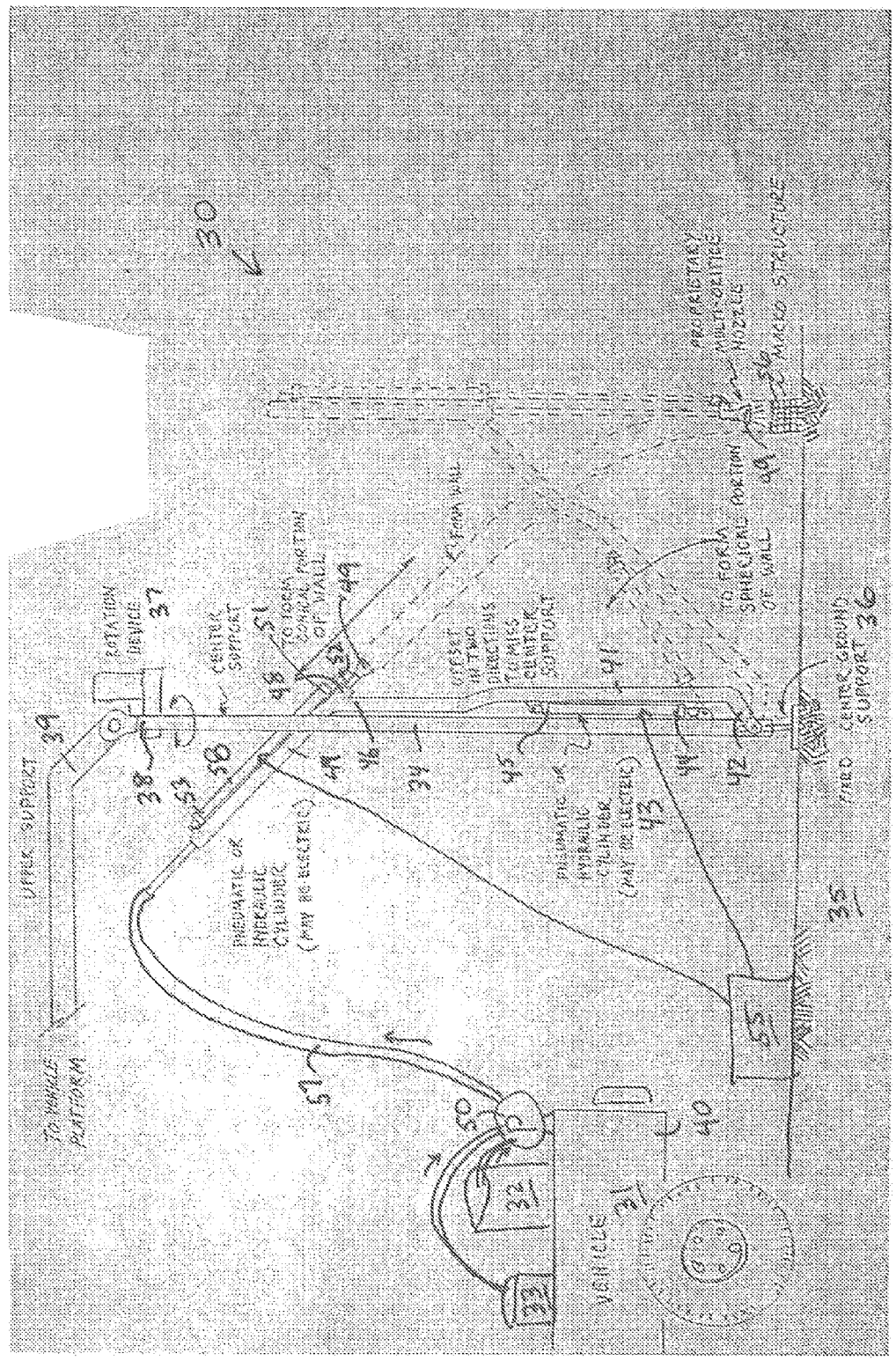
FIG. 2 is a side schematic view of a system for constructing an emergency shelter.
Figure 4:
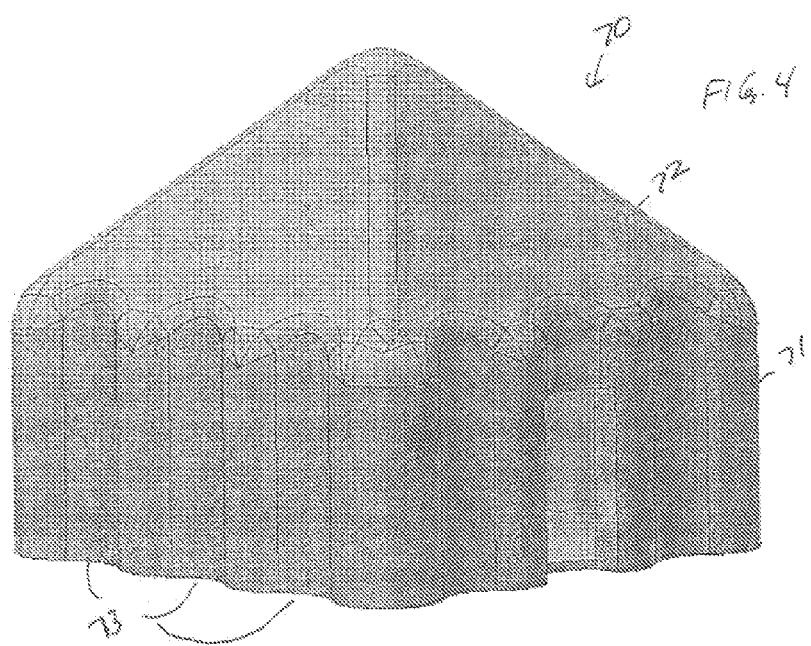
FIG. 4 is a side perspective view of an alternate embodiment for an emergency shelter.
Figure 3:
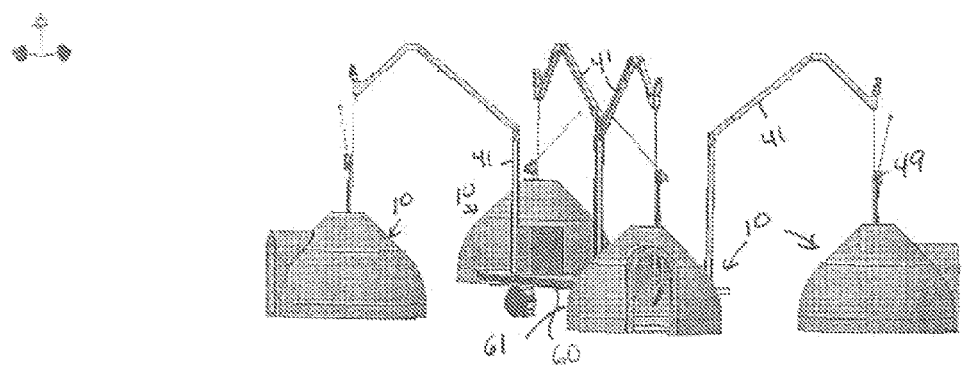
FIG. 3 is a side perspective view of a system for constructing a plurality of emergency shelters substantially simultaneously.

An exemplary system and method of making a shelter 10 such as that of FIG. 1 on-site can include the a setup 30 and use thereof such as shown in FIG. 2. Here a vehicle 31 such as a truck or portable trailer comes to the site with components 32 and 33 of foam precursor loaded thereon.

The truck 31 is also used to provide support to the spraying structure. A substantially vertical rotatable center support 34 is affixed to the ground 35 by means of a center ground support 36. A rotation device 37 to affixed adjacent a top end 38 of the center support 34, which is also hingedly connected to an upper support 39, which in turn is supported by the truck platform 40. A nozzle support 41 is hingedly affixed at a bottom end 42 to the center support 34. Movement of the nozzle support 41 relative to the center support 34 is effected by a pneumatic or hydraulic cylinder 43 having a bottom end 44 affixed to the center support 34 and a top end 45 affixed to the nozzle support 41 at a generally central location thereaalong. This function may also be accomplished using a PLC controller and servo-motors, by way of example.

The nozzle support 41 is affixed at a top end 46 to a spray cylinder bracket 47, at the distal 48 end of which is a spray nozzle 49. The spray nozzle 49 can comprise, for example, a multiorifice nozzle, although this is not intended as a limitation. The spray nozzle 49 is in fluid communication during operation with a proportioning pump 50 on the truck 31. The pump 50 is used to deliver foam precursors 32 and 33 by way of heated hose 57 to the spray nozzle 49. Opening and closing of the spray nozzle 49 is effected by a pneumatic or hydraulic cylinder. Opening and closing the spray nozzle 49 can also be effected by an electromechanical device attached to the spray nozzle 49. A linear actuator 58 attached to the spray cylinder bracket 47 guides the spray nozzle 49 during formation of the vertical and conical walled portion of the dome 10.

In use, the foam material can be mixed on-site at the spray nozzle 49, as described above. The hydraulic or pneumatic cylinders 43,58, in signal communication with a control system 55 such as, for example, a processor and stepping motor, are effectuated to position the spray nozzle 49 to deliver a predetermined pattern of foam layers 56, for example, in a circular pattern, to gradually build up the walls 11 into a desired shape, which will start by assuming a substantially cylindrical shape near the bottom 12 and then move inward to create the apex 17 of the dome 10.

In an alternate embodiment (FIG. 3), a unitary platform 60 can support a plurality of, here, four, of nozzle supports 41 and nozzles 49, radially arranged about a central location 61. This arrangement permits the substantially simultaneous formation of a plurality of shelter structures 10.

The structure 10 can be anchored to the ground 35, for example, by auger-type anchors with T handles, once the structure walls 11 have reached a predetermined height, for example, but not intended to be limited to, 1 ft.

Another benefit of such on-site construction is that the wall's bottom edge 12 can be sprayed to conform with the contour of the ground 35, making the structure self-leveling and obviating the need for exacting ground preparation prior to construction.

Once the main part of the dome 10 is constructed, additional features can be built in, for example, by using a cutting device such as a heat source to melt the foam to make windows and doors. The spray nozzle 49 can also be used to construct the doorway 15.

An alternate embodiment of the shelter 70 (FIG. 4) can comprise walls 71 formed into a substantially rectangular configuration, with a substantially pyramidal roof structure 72 atop the walls 71. Preferably, the walls 71 have a plurality of corrugations 73 therein, for providing additional stability and protection.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and shelter illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method of forming a shelter structure in situ comprising the steps of:
    providing a source of water at a site on which it is desired to erect a shelter structure;
    mixing foam material precursors with the provided water to form a structural foam;
    spraying the formed structural foam in a plurality of layers in an upwardly extending helical pattern of decreasing diameter on the site to free form a domed structure having a foam wall defining an interior space; and
    cutting through the foam wall to form a passage into the interior space.

2. The method recited in claim 1, wherein the foam material precursors comprise precursors for forming a polyurethane foam.

3. The method recited in claim 1, wherein the spraying step comprises pumping the structural foam in a flowable state through a spray nozzle.

4. The method recited in claim 1, wherein the spraying step comprises moving a nozzle support having the spray nozzle affixed thereto to achieve the upwardly extending helical pattern.

5. The method recited in claim 4, wherein the nozzle support is under processor control for automatically controlling a predetermined movement thereof.

6. The method recited in claim 4, wherein the nozzle support comprises a plurality of nozzle supports and the spray nozzle comprises a plurality of spray nozzles positioned at a central location, each spray nozzle affixed to a unitary and respective nozzle support, and wherein the spraying step comprises spraying the formed structural form in a plurality of radially spaced locations surrounding the central location to form a plurality of domed structures.

7. The method recited in claim 1, further comprising the step, following the mixing step and prior to the spraying step, of spraying the formed structural foam onto a ground surface in a plurality of curved layers in order to create a starting layer having a substantially level height therearound.

8. The method recited in claim 1, wherein the spraying step is performed sufficiently slowly that each successive layer is substantially cured prior to an application of a next layer thereatop.

9. The method recited in claim 1, wherein the mixing step further comprises adding additional structural elements to the foam precursors for increasing a strength of the structure.

10. The method recited in claim 9, wherein the additional structural elements comprise glass fibers.

11. The method recited in claim 1, further comprising the step, following the mixing step and prior to the spraying step, of applying a foam layer to the site to form a floor structure, and wherein the spraying step comprises spraying the layers to encompass the formed floor structure.

12. A method of forming a shelter structure for transport to a remote site comprising the steps of:
    mixing foam material precursors to form a structural foam;
    spraying the formed structural foam in a plurality of layers in an upwardly extending helical pattern of decreasing diameter on the site to free form a domed structure having a foam wall defining an interior space; and
    transporting the domed structure to a remote site.

13. The method recited in claim 12, wherein the foam material precursors comprise precursors for forming a polyurethane foam.

14. The method recited in claim 12, wherein the spraying step comprises pumping the structural foam in a flowable state through a spray nozzle.

15. The method recited in claim 12, wherein the spraying step comprises moving a nozzle support having the spray nozzle affixed thereto to achieve the upwardly extending helical pattern.

16. The method recited in claim 15, wherein the nozzle support is under processor control for automatically controlling a predetermined movement thereof.

17. The method recited in claim 12, wherein the spraying step is performed sufficiently slowly that each successive layer is substantially cured prior to an application of a next layer thereatop.

18. The method recited in claim 12, wherein the mixing step further comprises adding additional structural elements to the foam precursors for increasing a strength of the structure.

19. The method recited in claim 18, wherein the additional structural elements comprise glass fibers.

20. A method of forming a shelter structure in situ comprising the steps of:
   providing a source of water at a site on which it is desired to erect a shelter structure;
   mixing foam material precursors with the provided water to form a structural foam;
   spraying the formed structural foam in a plurality of layers in an upwardly extending substantially rectangular pattern on the site to free form four foam walls, and then in a pyramidal pattern atop the foam walls to free form a roof thereon, the walls and the roof defining an interior space; and
   cutting through the foam wall to form a passage into the interior space.

21. The method recited in claim 20, wherein the spraying step comprises pumping the formed structural foam through a spray nozzle affixed to a nozzle support, the nozzle support under processor control for automatically controlling a predetermined movement thereof.

22. The method recited in claim 21, wherein the substantially rectangular pattern comprises a plurality of corrugations in each wall.

\* \* \* \* \*